J. J. TLUSTOS.
BED SPRING TIGHTENER.
APPLICATION FILED FEB. 1, 1910.
963,663.
Patented July 5, 1910.
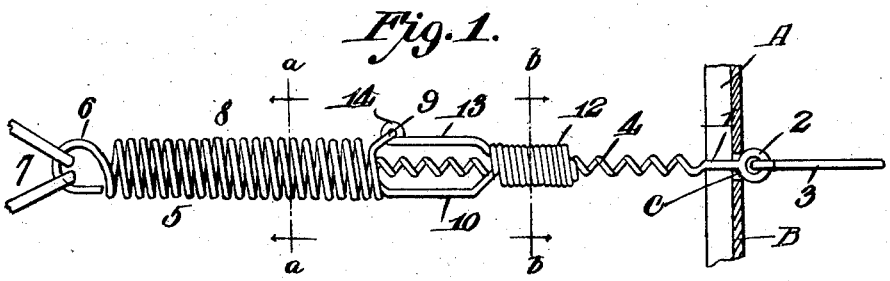
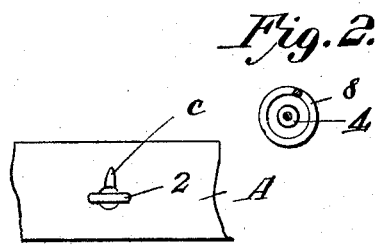
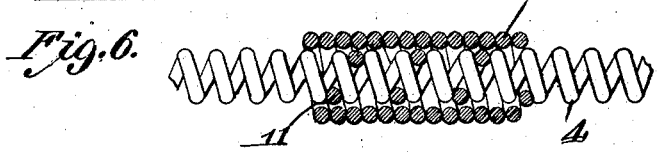
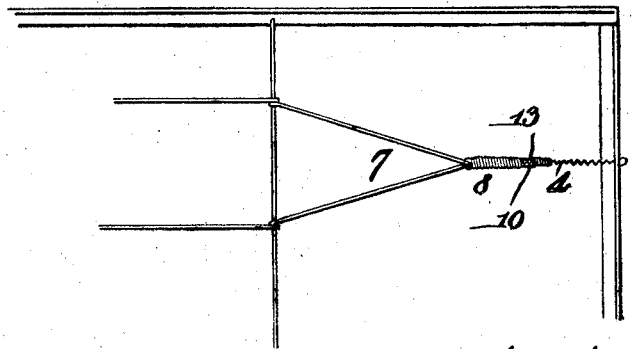
Witnesses
D. B. Galt.
J. W. Garner
Inventor
Joseph J. Tlustos.
By Victor J. Evans
Attorney.
THE NORRIS PETERS CO., WASHINGTON, D. C.

UNITED STATES PATENT OFFICE.

JOSEPH J. TLUSTOS, OF PIERCE, TEXAS.

BED-SPRING TIGHTENER.

963,663.

Specification of Letters Patent. Patented July 5, 1910.

Application filed February 1, 1910. Serial No. 541,316.

*To all whom it may concern:*

Be it known that I, JOSEPH J. TLUSTOS, a citizen of the United States, residing at Pierce, State of Texas, have invented new and useful Improvements in Bed-Spring Tighteners, of which the following is a specification.

This invention is an improved bed spring tightener, for adjusting the tension of a bed spring supporting wire as may be required from time to time, the said invention consisting in the construction, combination and arrangement of devices hereinafter described and claimed.

In the accompanying drawings:—Figure 1 is an elevation of a bed spring tightener constructed in accordance with my invention. Fig. 2 is a transverse sectional view of the same, on the plane indicated by the line $a$—$a$ of Fig. 1. Fig. 3 is a similar view of the same on the plane indicated by the line $b$—$b$ of Fig. 1. Fig. 4 is a detail, longitudinal section view of the same. Fig. 5 is an inverted plan of a portion of the frame of a spring bed bottom provided with supporting wires to which my improved tightening device is attached. Fig. 6 is a detail elevation of a portion of one bar of the frame, showing one of the recesses in the plate which covers the outer side of said bar.

In accordance with my invention, I provide a wire 1, which has an eye 2 at one end. Said end of the wire passes through an opening in a bar A of the bed frame in a plate B on the outer side of said bar, the said plate having a radial recess C in its outer side to receive one side of the eye of the wire 1 to prevent casual rotation of said wire. A hand hook 3 is provided for insertion in said eye for manipulation so as to disengage the eye from the recess C and turn the said wire 1 as may be required from time to time to regulate the tension of the spring bed bottom. The said wire 1 is provided with convolutions or screw splashers 4 in appearance substantially like those of a cork screw so that in effect the said wire 1 is a screw wire.

In connection with the screw wire, I provide a coil spring 5 which is made of a single piece of spring wire of suitable length and gage and is provided at one end with a hook 6 whereby it may be attached to a supporting wire or wires 7 of a spring bed bottom. The main convolutions 8 of the said coiled spring extend for a suitable distance from the end which is provided with a hook 6, the outer convolutions being formed with an offset 9, the wiring forming the coiled spring is then extended longitudinally for a suitable distance to form the straight portion 10 and is then provided with a series of internal convolutions 11, the diameter of which equals the diameter of the convolutions of the screw wire so that the said screw wire may be extended through and engaged with the internal convolutions 11, the latter forming in effect a nut engaged by the screw convolutions of the screw wire. The wire constituting the spring is then coiled reversely on the internal coils or convolutions 11, to form a series of internal convolutions 12 which cover the internal convolutions 11, the end portion 13 of the spring wire being extended parallel with the portion 10 and formed with a hook 14 which engages the offset 9. Hence, it will be understood that the coiled spring 5 with its end extensions 10—13 and its internally and externally coiled portion for engagement with the screw wire is formed from a single piece of wire. By turning the screw wire 1 the latter by the engagement of its screw convolutions 4 with the internal convolutions 11 of the extended portion of the coiled spring 5, will move said coiled spring longitudinally to apply the requisite tension thereto to cause it to exert any desired tension on the supporting wire or wires of the spring bed bottom.

Owing to the fact that my improved tightening device comprises a screw wire and a tension spring each of which is formed from a single piece of wire, it will be understood that my improved tightening device may be very readily manufactured at slight cost.

Having thus described the invention, what is claimed, is:—

1. A bed spring tightener comprising a screw wire for attachment to one side of a frame, and a tension spring for attachment to a supporting wire, said tension spring having an extended portion provided with internal and external convolutions, the former engaging said screw wire and co-acting therewith for the purpose set forth.

2. A bed spring tightener comprising a screw wire for attachment to one side of a frame, and a coiled spring for attachment to a supporting wire, said coiled spring having an extended end portion comprising a series of external convolutions and a series of reversely disposed internal convolutions, said internal convolutions engaging those of the screw wire and co-acting therewith for the purpose set forth.

In testimony whereof I affix my signature in presence of two witnesses.

JOSEPH J. TLUSTOS.

Witnesses:
  JOSEF TLUSTOS,
  WILL USTYNICK.